(12) United States Patent
Bor et al.

(10) Patent No.: US 9,921,135 B2
(45) Date of Patent: Mar. 20, 2018

(54) ROTATABLY DRIVING DEVICE FOR THE VISUAL INSPECTION OF A TIRE AND ASSOCIATED METHOD

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Gérard Bor, Clermont-Ferrand (FR); Alexandre Joly, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 98 days.

(21) Appl. No.: 14/907,098

(22) PCT Filed: Jul. 23, 2014

(86) PCT No.: PCT/EP2014/065776
§ 371 (c)(1),
(2) Date: Jan. 22, 2016

(87) PCT Pub. No.: WO2015/011171
PCT Pub. Date: Jan. 29, 2015

(65) Prior Publication Data
US 2016/0178482 A1    Jun. 23, 2016

(30) Foreign Application Priority Data

Jul. 25, 2013 (FR) ..................................... 13 57358

(51) Int. Cl.
*G01M 17/02* (2006.01)
*B60C 25/00* (2006.01)

(52) U.S. Cl.
CPC ......... *G01M 17/022* (2013.01); *B60C 25/005* (2013.01); *B60C 25/007* (2013.01); *G01M 17/021* (2013.01); *G01M 17/027* (2013.01)

(58) Field of Classification Search
None
See application file for complete search history.

(56) References Cited

U.S. PATENT DOCUMENTS

| 1,503,935 A | | 8/1924 | Baker | 180/228 |
| 1,669,622 A | * | 5/1928 | Messer | G01M 17/022 73/8 |

(Continued)

FOREIGN PATENT DOCUMENTS

| DE | 824 747 | 12/1951 |
| EP | 1 122 530 A2 | 8/2001 |

(Continued)

*Primary Examiner* — Jill Culler
(74) *Attorney, Agent, or Firm* — Fitzpatrick, Cella, Harper & Scinto (57) ABSTRACT

A device for rotating a tire includes a fixed support, a driving belt, a plurality of first pulleys, and at least one second pulley. The driving belt has a contact face for contacting an annular part of the tire, and the driving belt enables rotation of the tire. The first pulleys are mounted on the support and are in abutment with the driving belt on a side opposite to the contact face in order to press the contact face radially against the annular part of the tire. The at least one second pulley is in abutment with the contact face of the driving belt and is mounted for translational movement on the support in order to locally space the contact face apart from the annular part of the tire.

16 Claims, 6 Drawing Sheets

(56) References Cited

U.S. PATENT DOCUMENTS

| | | | |
|---|---|---|---|
| 3,520,180 A * | 7/1970 | Ris | G01M 17/045 |
| | | | 73/146 |
| 3,554,310 A | 1/1971 | Dieffenbach | 180/9.24 |
| 3,977,243 A * | 8/1976 | Yamada | G01M 17/022 |
| | | | 73/146 |
| 4,344,324 A * | 8/1982 | Langer | G01M 17/022 |
| | | | 73/146 |
| 4,458,527 A * | 7/1984 | McFarland | G01M 17/022 |
| | | | 73/146 |
| 5,481,907 A * | 1/1996 | Chasco | G01M 17/022 |
| | | | 73/146 |
| 6,584,835 B2 * | 7/2003 | Jenniges | G01M 17/022 |
| | | | 73/146 |
| 7,568,385 B2 | 8/2009 | Maehner et al. | 73/146 |
| 2008/0066532 A1 | 3/2008 | Shaw et al. | 73/146 |
| 2013/0128029 A1 | 5/2013 | Leobal et al. | 348/128 |

FOREIGN PATENT DOCUMENTS

| | | |
|---|---|---|
| EP | 1 959 227 A2 | 8/2008 |
| EP | 2 023 078 A1 | 2/2009 |
| EP | 2 172 737 A1 | 4/2010 |
| JP | 2011-237258 A | 11/2011 |
| WO | WO 2011/113711 A1 | 9/2011 |

* cited by examiner

ROTATABLY DRIVING DEVICE FOR THE VISUAL INSPECTION OF A TIRE AND ASSOCIATED METHOD

FIELD OF THE INVENTION

The present invention relates to the field of the visual examination of tires.

RELATED ART

More particularly, the invention relates to devices that are used to rotate tires in order to carry out operations of visually examining surfaces of the latter.

Visual inspection is largely carried out during the process of manufacturing tires and most often uses the dexterity of the operators tasked with verifying the absence of visible imperfections on the surface of the tires in order to ensure the conformity thereof.

However, with the advancement in the computational power of computer facilities, tire manufacturers are seeking to develop automatic examination means for assisting the operators tasked with visual examination. To this end, it is possible to use an inspection apparatus comprising lighting means and cameras disposed so as to sweep both the outer and inner regions of the lateral beads and of the tread of the tire to be examined. The field of coverage of each camera is angularly limited. In order to obtain complete images of the inside and the outside of the tire, it is necessary to rotate the tire about its axis with respect to the lighting means and the cameras. The digital images obtained are then processed and compared with reference images in order to determine any surface anomalies and anomalies in the appearance of the tire. For more details, reference may be made for example to the Patent Applications EP - A 2-1 959 227, EP - A 1- 2 023 078 and EP - A 1 - 2 172 737.

In order to carry out such an inspection, it is necessary to use a device that precisely centers and rotates the tire. A drive device comprising a plurality of pairs of hooks that bear against the internal faces of the lateral beads of the tire so as to space them apart relative to one another is known from document US 2008/0066532. The hooks are able to move between an engaged position for holding and rotating the tire and a retracted position for introducing and removing the tire.

This device has the major drawback of not making it possible to produce images of the internal faces of the lateral beads of the tire in the bearing regions of the hooks. Thus, these concealed regions cannot be examined without angularly repositioning the tire beforehand with respect to the hooks.

Furthermore, the hooks can deform or even mark the internal faces of the lateral beads locally, thereby furnishing erroneous indications of the surface state of the tire.

BRIEF DESCRIPTION OF EMBODIMENTS OF THE INVENTION

The present invention aims to overcome these drawbacks.

More particularly, the present invention aims to provide a device for rotating a tire that makes it possible to carry out visual inspections without there being concealed regions on the inside and/or outside of the tire.

The present invention also aims to provide a device for obtaining precise centering without having the tire slip off during rotation, which is stable, precise and repeatable.

The present invention also aims to provide a device that makes it possible to preserve the geometry of the tire while it is being rotated.

In one embodiment, the device for rotating a tire comprises a fixed support, a driving belt that is provided with a contact face for making contact with an annular part of the tire and is able to allow said tire to be rotated about its axis, and a plurality of first pulleys that are mounted on the support and are in abutment with the driving belt on the side opposite to the contact face in order to press said contact face radially against the annular part of the tire. The device also comprises at least one second pulley that is in abutment with the contact face of the driving belt and is mounted so as to be able to move in translation on the support in order to locally space a part of said contact face apart from the annular part of the tire, the rest of the contact face being pressed against said annular part by the first pulleys; and means for rotating at least one of the pulleys in order to set the driving belt in rotation.

By virtue of the device, the driving belt is tensioned and is pressed against the tire, thereby making it possible to center the latter and rotate it in a slip-free manner by friction. The belt makes it possible to produce stable and repeatable driving of the tire without any disruptive relative movement. Moreover, the driving belt does not mark or damage the surface of the tire.

Furthermore, the disposition of the pulleys makes it possible to locally disengage the contact face of the belt from the tire so as not to have concealed regions over a limited angular sector of the tire for the purposes of visual inspection.

Preferably, said second pulley is situated in an angular sector delimited by two successive first pulleys.

Advantageously, the device also comprises means for axially holding the tire that are able to come into axial abutment with one of the lateral beads of said tire.

The driving belt may comprise a bearing flange that radially extends the contact face of said belt and at least partially forms the axial holding means, said flange being able to come into abutment with the external face or internal face of said lateral bead of the tire. Alternatively or in combination, the axial holding means may comprise at least one roller that is able to move with respect to the fixed support between a spaced-apart position and a close position relative to the tire, in which said roller is able to come into abutment with the internal face of said lateral bead of the tire.

Preferably, each pulley is mounted on a shaft parallel to the axis of rotation of the tire. Said second pulley may be able to move radially in translation on the support. The first pulleys may be mounted so as to be able to move in translation on the support.

In one embodiment, an outer face of the driving belt forms the contact face for making contact with the tire and is able to come into radial contact with the bore in one of the lateral beads of said tire. Said second pulley may be offset radially towards the inside with respect to the first pulleys. Advantageously, the outer face of the driving belt may have a frustoconical shape matching the shape of the bore in said lateral bead of the tire.

In another embodiment, an inner face of the driving belt forms the contact face for making contact with the tire and is able to come into radial contact with the tread of said tire. Said second pulley may be offset radially towards the outside with respect to the first pulleys. Preferably, the device also comprises centering means that are mounted on the support and are able to come into radial abutment with the bore in one of the lateral beads of the tire.

The invention also relates to a method for inspecting a tire with the aid of a device as defined above, comprising the steps in which the contact face of the driving belt is pressed radially against the annular part of the tire with the aid of the first pulleys, the position of the second pulley on the support is adjusted in order to locally space the contact face of the driving belt apart from the annular part of the tire with the aid of the second pulley, there are image acquisition means for acquiring at least one image of an angular region of the surface of the tire corresponding to the region in which the contact face of the driving belt remains at a distance from the tire, at least one of the pulleys is rotated in order to drive the driving belt and the tire in rotation, and the image of said surface of the tire is produced.

BRIEF DESCRIPTION OF THE DRAWINGS

The present invention will be better understood by reading the detailed description of embodiments that are given by way of non-limiting example and are illustrated by the appended drawings, in which.

DETAILED DESCRIPTION OF EMBODIMENTS OF THE INVENTION

Figure 1:
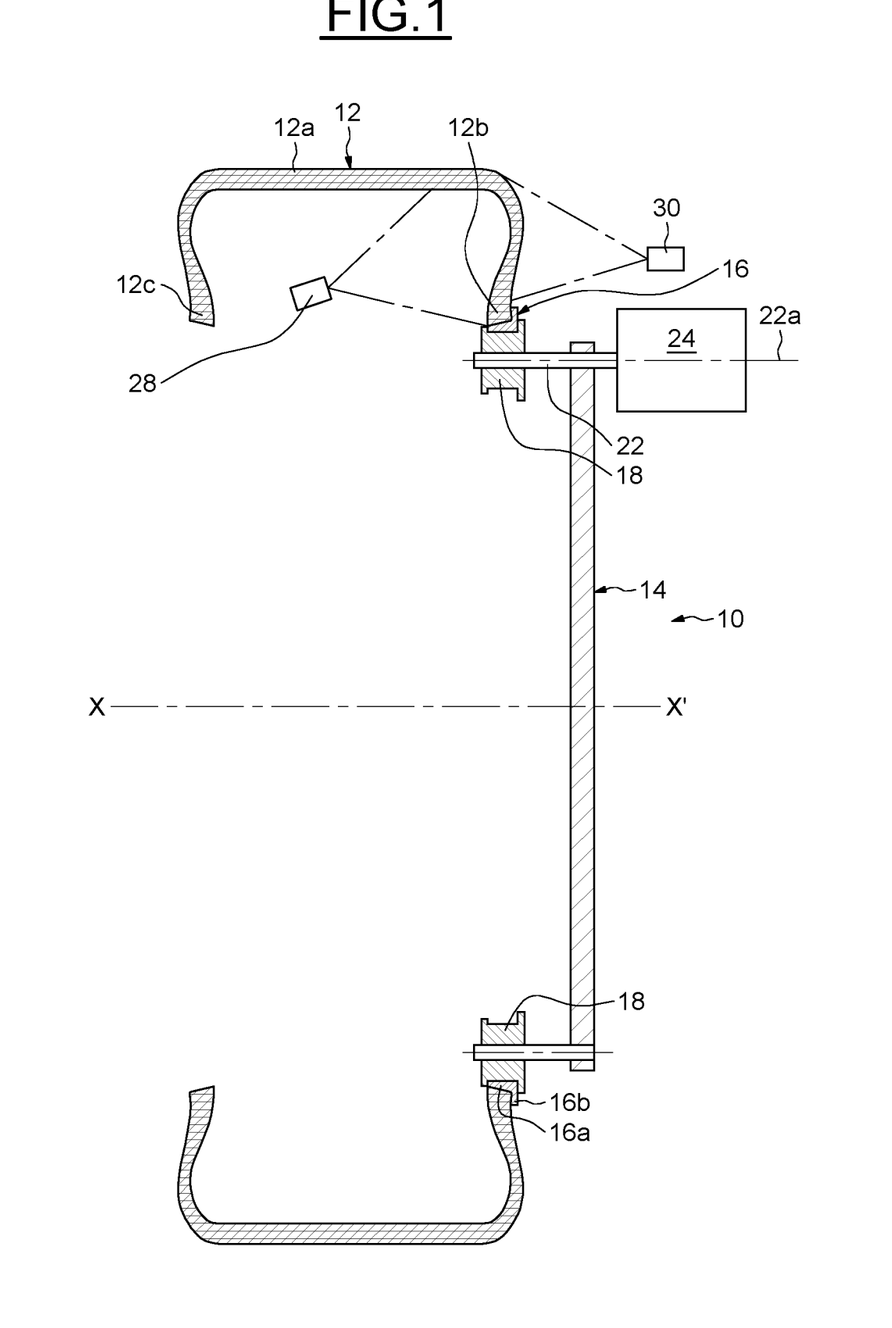
FIG. 1 is a schematic cross-sectional view of a device for rotating a tire according to a first example of the invention.
Figure 2:
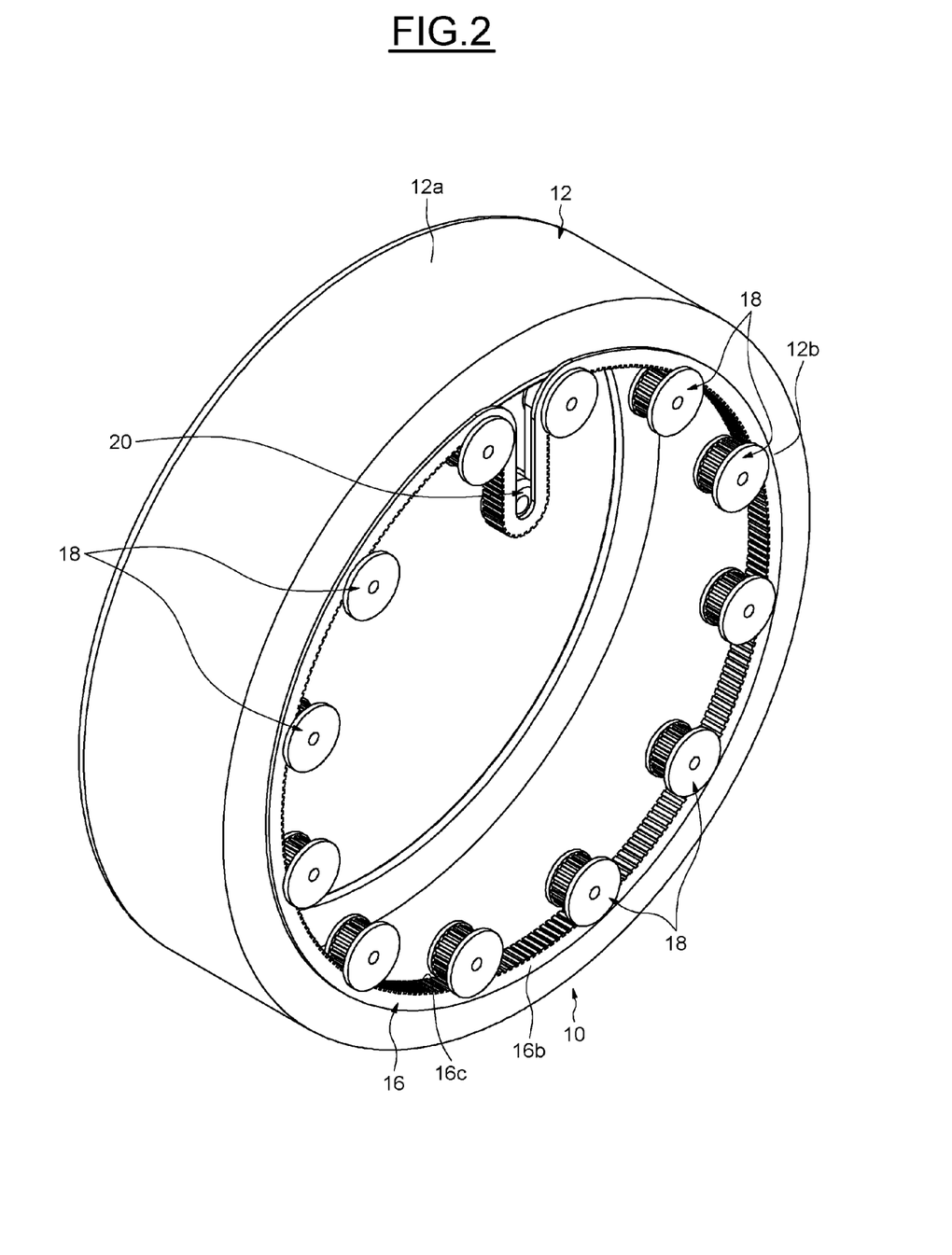
FIG. 2 is a perspective view of the device of FIG. 1.
Figure 3:
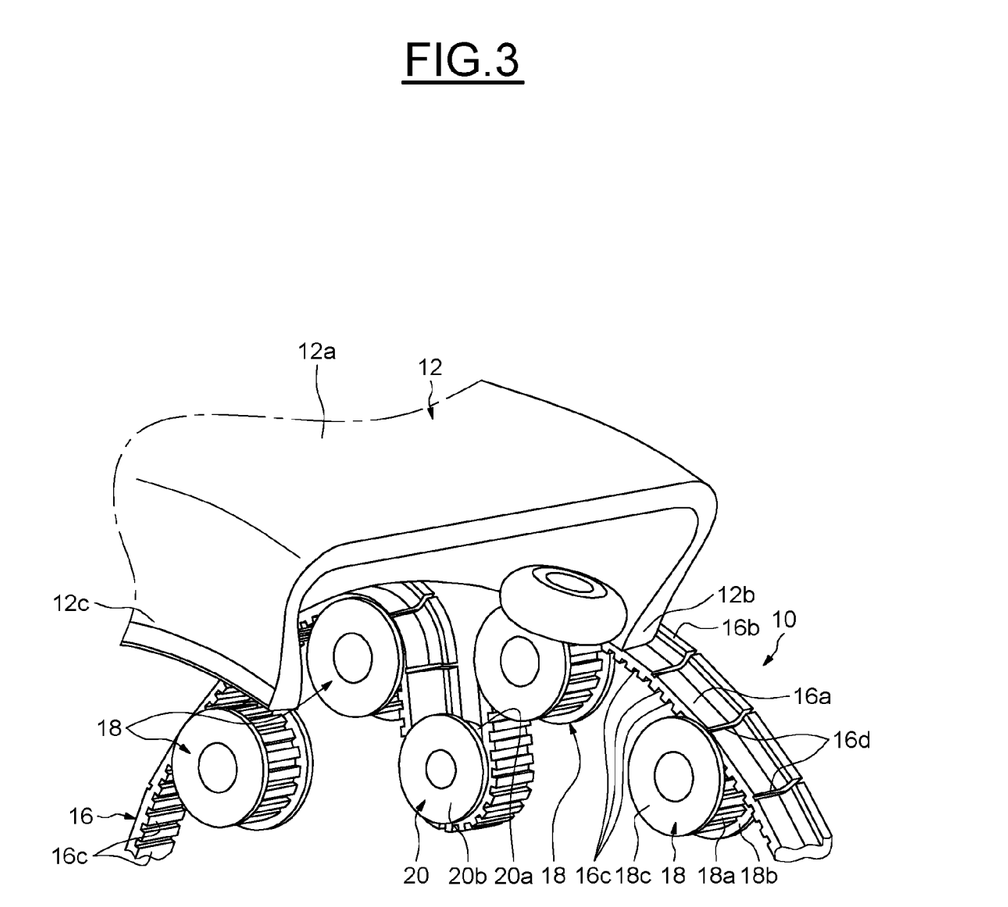
FIG. 3 is a partial perspective view of the device of FIG. 1.

FIGS. 1 to 3 show an example embodiment of a device, referenced 10 overall, provided to hold and rotate a tire 12. In the exemplary embodiment illustrated, the tire 12 is rotated about its axis X-X' in a position of said axis that is assumed to be horizontal. The tire 12, of annular shape, comprises a cylindrical tread 12a that is extended at each end by a lateral sidewall comprising a lateral bead 12b, 12c.

The device 10 comprises a fixed support 14, a driving belt 16 for rotating the tire 12 and a plurality of pulleys 18, 20 that are mounted on the support 14 and allow the driving belt to be pressed against the tire and to be tensioned, as will be described in more detail below.

The driving belt 16, of annular overall shape, comprises an axial centering part 16a that is mounted radially in abutment with the bore in the lateral bead 12b of the tire, and a radial flange 16b that extends said centering part towards the outside. The centering part 16a has an outer face that is in contact with and matches the shape of the bore in the lateral bead 12b in order to achieve good centering of the tire 12 on the driving belt 16. The outer face of the centering part 16a is frustoconical. The flange 16b extends one end of this outer face radially towards the outside and comes into axial abutment with the external face of the lateral bead 12b of the tire. The flange 16b forms an external holding means for the bead 12b.

The driving belt 16 also comprises an inner face, opposite to the outer face, that is provided with a plurality of projecting teeth 16c that are directed radially towards the inside. The teeth 16c are distributed along the entire length of the belt, being spaced apart regularly from one another in the circumferential direction. The driving belt 16 also comprises notches 16d that are formed around the entire periphery of the outer face of the centering portion 16a and of the flange 16b so as to increase its flexibility. In the example, the driving belt 16 is produced in one piece, for example from elastomer or thermoplastic material. In a variant, the driving belt can be produced in two parts that are joined together by any appropriate means, for example adhesive bonding or overmoulding, in which a first, inner part comprises the teeth and a second, outer part bears against the tire.

The pulleys 18 are mounted so as to be able to move in translation on the support 14 in order to ensure that the outer face of the driving belt 16 is pressed against the annular bore in the lateral bead 12b of the tire and that said belt is tensioned. The pulleys 18 are identical to one another and mounted so as to be able to move in the radial direction with respect to the support 14. The pulleys 18 are contiguous in the circumferential direction and spaced apart from one another with a constant spacing. In the exemplary embodiment illustrated, there are twelve pulleys 18.

Each pulley 18 is supported by a shaft 22, with an axis 22a parallel to the axis X-X' of the tire, which is itself mounted so as to slide in the radial direction on the support 14. To this end, a plurality of mobile frames (not shown) that are mounted in a sliding manner can be provided on the support 14 in order to mount the shafts 22. Each pulley 18 comprises, on its outer surface, a plurality of teeth 18a that are provided to mesh with the teeth 16c on the driving belt, and two opposite end flanges 18b, 18c for guiding said belt. The end flange 18b bears axially against the flange 16b of the driving belt axially on the side away from the lateral bead 12b of the tire, and the end flange 18c bears axially against the free end of the centering part 16a of the belt.

In order for the driving belt 16 to be drive in rotation, the device 10 also comprises an electric motor 24 associated with one of the pulleys 18. For this pulley 18, the rotating shaft of the motor 24 forms the shaft 22 on which said pulley is fixed. The other pulleys 18 are mounted so as to rotate freely on the shafts 22 about their respective axes that are oriented in the axial direction so as to be able to be driven by the driving belt 16. In the example illustrated, a single electric motor is provided for rotating the associated pulley 18 and the belt 16. In a variant, it is possible to provide rotational drive means for a plurality of pulleys 18, or even for all of the pulleys.

The pulley 20 is supported by a shaft (not shown), with an axis parallel to the axis X-X' of the tire, that is mounted so as to slide in the radial direction on the support 14. In a similar manner to the pulleys 18, a frame that is mounted in a sliding manner can be provided on the support 14 in order to mount the support shaft for the pulley 20. The pulley 20 is fixed to the shaft. The pulley 20 comprises a smooth outer surface 20a that is mounted radially in abutment with the outer face of the driving belt 16, and an end flange 20b that bears axially against the free end of the centering part 16a of the belt. The pulley 20 is offset radially towards the inside with respect to the pulleys 18. The pulley 20 is situated in an angular sector delimited by two successive pulleys 18. The pulley 20 is disposed in the circumferential direction between two pulleys 18, being offset in the direction of the axis X-X' of the tire with respect to said pulleys 18. Given the relative radial disposition between the pulleys 18 bearing against the inner face of the driving belt 16 and the pulley 20 bearing against the outer face of said belt, a portion of the belt is situated radially away from the bore in the lateral bead 12b of the tire, the rest of the belt being pressed radially against said bore.

The device 10 also comprises a plurality of inner holding rollers 26 that are mounted so as to rotate freely about their respective axes that are oriented in the radial direction. The holding rollers 26 are identical to one another and spaced apart regularly in the circumferential direction. The rollers 26 are mounted so as to be able to move radially on the support 14 between a retracted position, in which they are moved back radially towards the axis X-X' so as to allow the tire 12 to be mounted or removed, and a deployed position, as is illustrated in the figures, in which they come into axial contact with the internal face of the lateral bead 12b of the tire. Each roller 26 is mounted on a shaft (not shown) that extends radially and is itself supported by a shaft (not shown) that is mounted so as to slide in the radial direction on the support 14. To this end, a movable frame (not shown) that is mounted in a sliding manner can be provided on the support 14. The rollers 26 make it possible for the lateral bead 12b of the tire to be wedged securely and precisely on the outer face of the driving belt 16 and to be pressed against the flange 16b of the belt. The rollers 26 and the flange form means for laterally holding the bead 12b of the tire. Advantageously, the rollers 26 comprise, on their outer surface, a coating made of flexible elastic material so that they do not mark the tire 12 and can be associated with lateral beads having different shapes.

As will be described below, the device 10 also comprises first and second image acquisition means 28, 30 for visually inspecting the tire. Each acquisition means 28, 30 can comprise a lighting means of the laser or slot-light type that forms a ray of light, and one or more cameras that are able to capture the light reflected by the tire 12.

The tire 12 is inspected with the aid of the device 10 as follows. In a first step, the pulleys 18 supporting the driving belt 16 are moved towards the outside in the direction of the tire 12 until the outer face of the belt is pressed radially against the bore in the lateral bead 12b of the tire. The flange 16b of the belt bears axially against the external face of the bead 12b. The tire 12 is then supported by the pulleys 18 which are situated at one and the same diameter. This step makes it possible to tension the driving belt 16 and to bring it to the centering diameter of the tire 12.

Next, during a second step, the pulley 20 is moved towards the inside so as to further tension the driving belt 16 and to locally space the outer face of the belt apart from the bore in the lateral bead 12b of the tire. The pulley 20 is offset radially towards the inside in the direction of the axis X-X' of the tire with respect to the pulleys 18. The pulley 20 forms an idler pulley. The major part of the driving belt 16 is situated radially between the pulleys 18 and the tire 12, apart from in the region of the pulley 20, in which said pulley is situated radially between the belt 16 and the tire. During a third step, the rollers 26 are deployed radially so as to bring them axially into contact with the internal face of the lateral bead 12b of the tire.

Next, during a fourth step, the first image acquisition means 28 are introduced into the interior of the tire 12 in order to acquire an image of an angular region of predetermined angle of the internal surface of the tire, which corresponds to the region in which the outer face of the driving belt 16 remains at a distance from the tire. Preferably, the field of coverage is centered substantially on the angular sector formed by the two successive pulleys 18, between which the pulley 20 is situated. The internal surface of the lateral bead 12b and of the tread 12a of the tire can then be inspected without there being concealed regions in the field of coverage of the acquisition means 28. The second image acquisition means 30 are also disposed outside the tire 12 in order to acquire an image of an angular region of the external surface of the lateral bead 12b and of the tread 12a of the tire.

Finally, in a fifth and final step, the electric motor 24 is actuated so as to set the associated pulley 18 in rotation, said pulley driving the belt 16 by meshing. The belt 16 drives the other pulleys 18, 20 in rotation by meshing. The belt 16 thus drives the tire 12 in rotation about its axis X-X' by adhesion and without slip. The tire 12 can be made to rotate through 360 degrees in order that the image acquisition means 28, 30 acquire all of the images that make it possible to form the complete image of the internal and external surfaces of the lateral bead 12b and of the tread 12 a of the tire.

In the illustrated example, a single device 10 is used to hold and rotate the tire 12. It is also possible to provide a second, identical device associated with the lateral bead 12c of the tire in order to hold this bead, or even to space the two beads of the tire axially apart from one another. Provision can also be made of image acquisition means inside and outside the tire 12 in order to acquire images of the internal and external surfaces of the lateral bead 12c of the tire.

Figure 4:
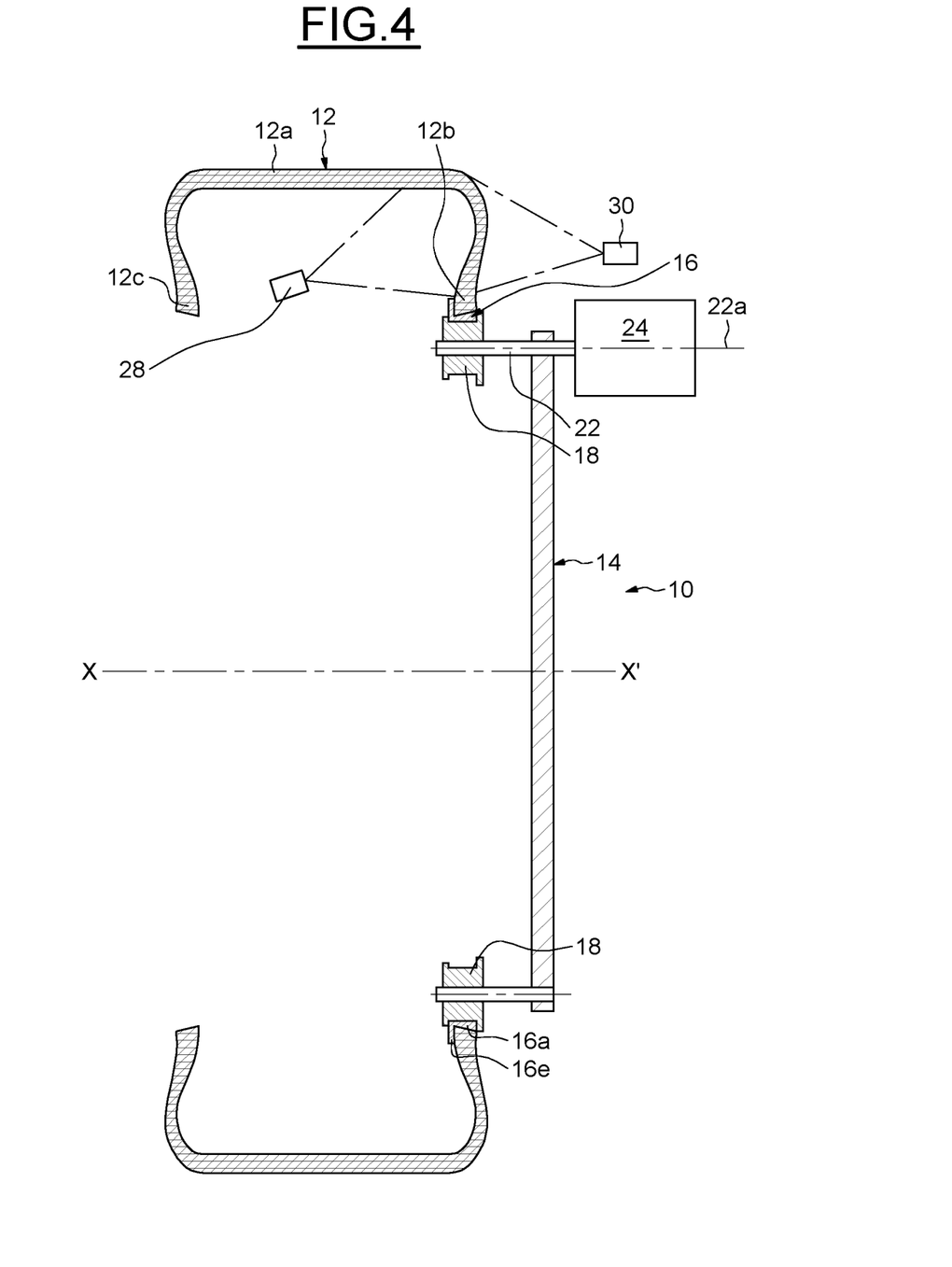
FIG. 4 is a schematic cross-sectional view of a rotational drive device according to a second example of the invention.

The example illustrated in FIG. 4, in which identical parts have the same references, differs from the first example in that the driving belt 16 comprises a flange 16e that radially extends an end of the outer face of the centering part 16a towards the outside in order to bear axially against the internal face of the lateral bead 12b of the tire. Compared with the first illustrated example, the axial disposition of the flange is reversed. This disposition makes it possible to keep the lateral bead 12b on the inner side of the tire and, if necessary, to space the bead axially towards the outside in order to favour inspection of the inside.

In the two examples previously illustrated, the belt 16 is disposed on the inner side of the tire 12. In another embodiment, it is possible to provide a reverse radial disposition of the belt 16 relative to the tire 12, such that said belt 16 drives the tire by friction on the outer side, as is shown in the exemplary embodiment illustrated in FIGS. 5 and 6.

Figure 5:
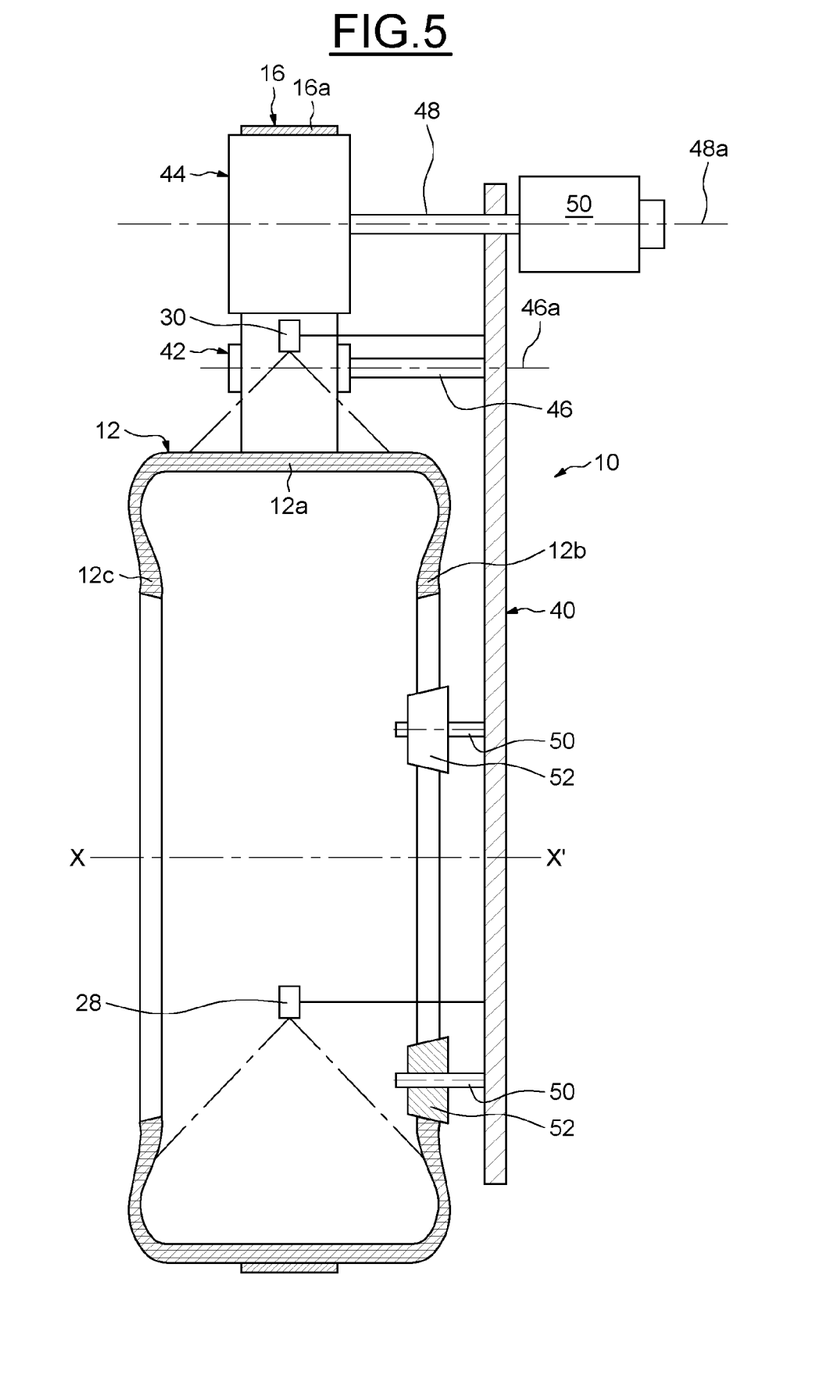
FIGS. 5 and 6 are a schematic cross-sectional view and a schematic front view, respectively, of a rotational drive device according to a third example of the invention.
Figure 6:
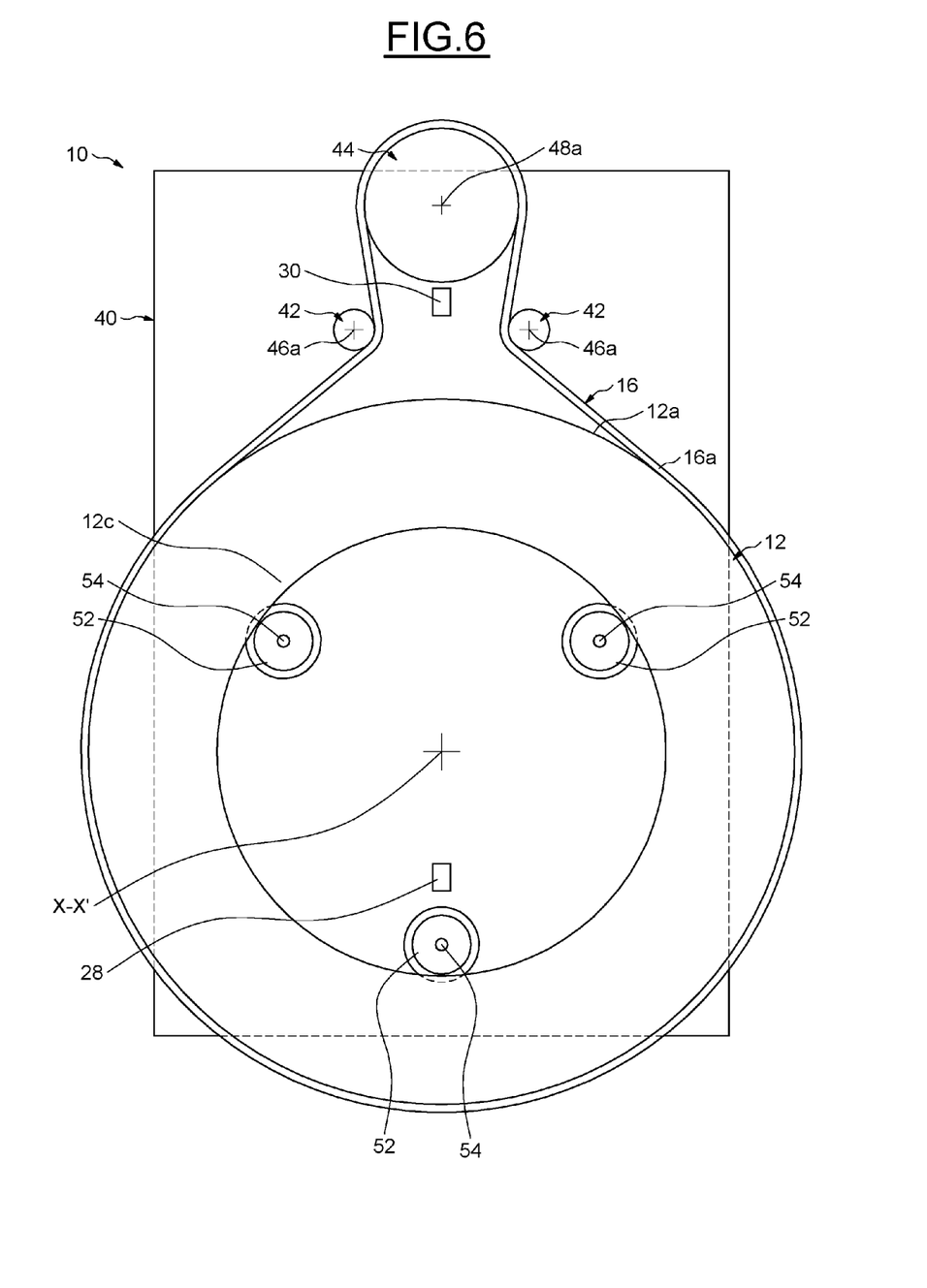

The device 10 as illustrated in FIGS. 5 and 6 is shown in a position in which the belt 16 rotates the tire 12 about its horizontally oriented axis X-X'. The device 10 comprises a fixed support 40 and three pulleys 42, 44 that are mounted on the support 40 and allow the driving belt to be pressed against the tire and to be tensioned.

The two pulleys 42 are provided to ensure that the inner face of the driving belt 16 is pressed against the outer face of the tread 12a of the tire and that said belt is tensioned. The pulleys 42 are identical to one another and are each mounted on a shaft 46, with an axis 46a parallel to the axis X-X' of the tire, that is fixed to the support 40. In a variant, it is possible to provide for the pulleys 42 to be mounted in a sliding manner, for example in the radial direction, on the support 40. The pulleys 42 are rotationally fixed with respect to their respective axes that are oriented in the axial direction. The pulleys 42 are mounted on the support 40 at one and the same diameter. Each pulley 42 comprises a smooth outer surface that is mounted radially so as to bear against the outer face of the driving belt 16. In the exemplary embodiment illustrated, the belt 16 is formed by the axial centering part 16a.

The pulley 44 is mounted on the rotating shaft 48 of an electric motor 50 disposed on the support 40. The motor 50 is mounted so as to slide on the support 40 in the radial direction. To this end, a movable frame (not shown) that is mounted in a sliding manner can be provided on the support 40. The axis 48a of the shaft of the motor is parallel to the axis X-X' of the tire. The driving pulley 44 comprises, on its outer surface, a plurality of teeth that are provided to mesh with the teeth on the inner face of the driving belt 16. The pulley 44 is offset radially towards the outside with respect to the pulleys 42. The pulley 44 is disposed in the circumferential direction between the pulleys 42. The pulley 44 is situated in an angular sector delimited by the two pulleys 42. Given the relative radial disposition between the pulleys 42 bearing against the outer face of the driving belt 16 and the pulley 44 bearing against the inner face of said belt, a part of the belt 16 is situated radially at a distance from the outer face of the tread 12a of the tire, the rest of the belt being pressed radially against said face.

The device 10 also comprises centering means 52, in this case three centering means 52, that are fixed to the support 40 and bear radially against the bore in the lateral bead 12b of the tire. The centering means are identical to one another and are each mounted on a shaft 54 that extends axially and is fixed to the support 40. In this example, the acquisition means 28, 30 are fixed to the support 40.

In order to mount the tire 12 on the device, the tire is introduced into the interior of the belt 16, and then the pulley 44 is moved towards the outside so as, together with the pulleys 42, to press the inner face of the driving belt 16 radially against the bead 12a of the tire. The belt 16 circles the tire 12. The belt 16 covers the tire 12. While the pulley 44 is being moved, the belt is also tensioned. In order to facilitate the introduction and removal of the tire 12 into and out of the driving belt 16, the latter can comprise elements made of embedded metal material so that the belt can be deformed by the use of electromagnets. It is also possible to provide a belt with an external shape which is designed to facilitate coupling for the purpose of the manual or mechanical deformation thereof, for example an I shape.

The device of this example has the advantage of having a simplified and more economical design and also greater adaptability to different tire sizes. In this exemplary embodiment, the inner face of the driving belt 16 is provided with meshing teeth that come into radial contact with the tread 12a of the tire. Alternatively, it is possible to provide the teeth on the outer face of the belt 16, the inner face being smooth. In this case, the pulleys 42 comprise meshing teeth, at least one of the two being a driving pulley, and the pulley 44 comprises a smooth outer surface.

In all of the exemplary embodiments illustrated, the devices for holding and rotating the tire 12 are disposed in an orientation with a horizontal axis. Each device can also be used in an orientation with a vertical axis or an oblique axis.

By virtue of the invention, a device comprising first pulleys that bear against the driving belt on the side away from the contact face for making contact with the inside or outside of the tire and at least one second pulley that bears against said contact face and is offset radially with respect to the first pulleys so as to locally divert the belt in order that a part of the latter leaves the tire completely free over a limited angular sector is provided. The mounting of the second pulley such that it is able to move in translation makes it possible in particular to regulate the tension of the driving belt. This also ensures that the device is adaptable to different tire sizes. In order to obtain even greater adaptability, it is possible to provide a plurality of second pulleys that are preferably disposed regularly in the circumferential direction. Furthermore, the use of a belt makes it possible to center and rotate the tire by adhesion, without surface marking, and in a stable manner without any disruptive movement between these two elements in order to be able to produce precise images of the tire.

The invention claimed is:

1. A device for rotating a tire, the device comprising:
   a fixed support;
   a driving belt having a contact face for making contact with an annular part of the tire, the driving belt enabling the tire to be rotated about an axis of rotation of the tire;
   a plurality of first pulleys mounted on the support, the first pulleys being positioned in abutment with the driving belt on a side opposite to the contact face in order to press the contact face radially against the annular part of the tire;
   a second pulley positioned in abutment with the contact face, the second pulley being mounted so as to be able to move in translation on the support in order to locally space a part of the contact face apart from the annular part of the tire, a remainder of the contact face being pressed against the annular part by the first pulleys; and
   a rotation device structured to rotate at least one of the pulleys in order to set the driving belt in movement.

2. The device according to claim 1, wherein the second pulley is situated in an angular sector delimited by two successive first pulleys.

3. The device according to claim 1, further comprising an axial holding element arranged to hold the tire axially, the axial holding element being structured to come into axial abutment with a lateral bead of the tire.

4. The device according to claim 3, wherein the driving belt includes a bearing flange that radially extends the contact face of the driving belt and at least partially forms the axial holding element, the bearing flange being structured to come into abutment with an external face or an internal face of the lateral bead of the tire.

5. The device according to claim 3, wherein the axial holding element includes a roller arranged to move with respect to the support between a spaced-apart position and a close position relative to the tire, the roller being structured to come into abutment with an internal face of the lateral bead of the tire.

6. The device according to claim 1, wherein each of the first and second pulleys is mounted on a respective shaft having an axis parallel to the axis of rotation of the tire.

7. The device according to claim 1, wherein the second pulley is arranged to move radially in translation on the support.

8. The device according to claim 1, wherein the first pulleys are mounted for translational movement on the support.

9. The device according to claim 1, wherein an outer face of the driving belt forms the contact face for making contact with the tire and is arranged to come into radial contact with a bore in a lateral bead of the tire.

10. The device according to claim 9, wherein the second pulley is offset radially towards an inside direction with respect to the first pulleys.

11. The device according to claim 9, wherein the outer face of the driving belt has a frustoconical shape matching a shape of the bore in the lateral bead of the tire.

12. A method for inspecting a tire, the method comprising:
obtaining a device for rotating the tire, the device including:
- a fixed support,
- a driving belt having a contact face for making contact with an annular part of the tire, the driving belt enabling the tire to be rotated about an axis of rotation of the tire,
- a plurality of first pulleys mounted on the support, the first pulleys being positioned in abutment with the driving belt on a side opposite to the contact face in order to press the contact face radially against the annular part of the tire,
- a second pulley positioned in abutment with the contact face, the second pulley being mounted so as to be able to move in translation on the support in order to locally space a part of the contact face apart from the annular part of the tire, a remainder of the contact face being pressed against the annular part by the first pulleys, and
- a rotation device structured to rotate at least one of the first pulleys in order to set the driving belt in movement;

radially pressing the contact face of the driving belt against the annular part of the tire using the first pulleys;

adjusting a position of the second pulley on the support in order to locally space the contact face of the driving belt apart from the annular part of the tire using the second pulley;

arranging an image acquisition device to enable acquisition of an image of an angular region of a surface of the tire corresponding to a region in which the contact face of the driving belt remains at a distance from the tire;

rotating at least one of the pulleys in order to drive the driving belt and drive the tire in rotation; and acquiring an image of the surface of the tire.

13. A device for rotating a tire, the device comprising:
- a fixed support;
- a driving belt having a contact face for making contact with an annular part of the tire, the driving belt enabling the tire to be rotated about an axis of rotation of the tire;
- a plurality of first pulleys mounted on the support, the first pulleys being positioned in abutment with the driving belt on a side opposite to the contact face in order to press the contact face radially against the annular part of the tire;
- a second pulley positioned in abutment with the contact face, the second pulley being mounted so as to be able to move in translation on the support in order to locally space a part of the contact face apart from the annular part of the tire, a remainder of the contact face being pressed against the annular part by the first pulleys; and
- a rotation device structured to rotate the second pulley in order to set the driving belt in movement.

14. The device according to claim 13, wherein an inner face of the driving belt forms the contact face for making contact with the tire and is arranged to come into radial contact with a tread of the tire.

15. The device according to claim 14, wherein the second pulley is offset radially towards an outside direction with respect to the first pulleys.

16. The device according to claim 14 further comprising a centering element mounted on the support and structured to come into radial abutment with a bore in a lateral bead of the tire.

* * * * *